United States Patent
Wellbrock et al.

(10) Patent No.: US 9,692,503 B2
(45) Date of Patent: Jun. 27, 2017

(54) NETWORK PROTECTION THROUGH EXCESS DIRECTIONS OF RECONFIGURABLE OPTICAL ADD/DROP MULTIPLEXOR (ROADM)

(71) Applicant: Verizon Patent and Licensing Inc., Arlington, VA (US)

(72) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 65 days.

(21) Appl. No.: 14/532,574

(22) Filed: Nov. 4, 2014

(65) Prior Publication Data

US 2016/0127034 A1    May 5, 2016

(51) Int. Cl.
*H04J 14/02*    (2006.01)
*H04B 10/032*    (2013.01)

(52) U.S. Cl.
CPC .......... *H04B 10/032* (2013.01); *H04J 14/021* (2013.01); *H04J 14/0291* (2013.01)

(58) Field of Classification Search
CPC .... H04B 398/02–398/05; H04B 10/032; H04J 14/0291; H04J 14/021
See application file for complete search history.

(56) References Cited

U.S. PATENT DOCUMENTS

| | | | | |
|---|---|---|---|---|
| 7,058,012 B1* | 6/2006 | Chen | .......................... | H04J 3/14 370/222 |
| 7,519,294 B2* | 4/2009 | Bullock | .............. | H04J 14/0227 398/167.5 |
| 8,965,198 B2* | 2/2015 | Zhang | ................. | H04J 14/0212 398/1 |
| 2004/0057375 A1* | 3/2004 | Shiragaki | ............ | H04J 14/0212 370/216 |
| 2015/0125141 A1* | 5/2015 | Hu | ....................... | H04J 14/0212 398/5 |
| 2015/0188624 A1* | 7/2015 | Syed | .................... | H04B 10/032 398/5 |
| 2016/0119082 A1* | 4/2016 | Lanzone | ............... | H04L 1/0009 714/776 |

* cited by examiner

*Primary Examiner* — Leslie Pascal

(57) ABSTRACT

A first reconfigurable optical add/drop multiplexers (ROADM) and a second ROADM are connected by a primary light path and a protection light path. The first ROADM includes a first direction and a second direction, and the second ROADM includes a third direction and a fourth direction. The primary light path is coupled between the first direction and the third direction, and the protection light path is coupled between the second direction and the fourth direction. Transmissions on the primary light path are monitored, and when a problem is detected on the primary light path, the first and third directions are deactivated and the second and fourth directions are activated so that additional light signals are sent on the protection light path and not on the primary light path.

20 Claims, 9 Drawing Sheets

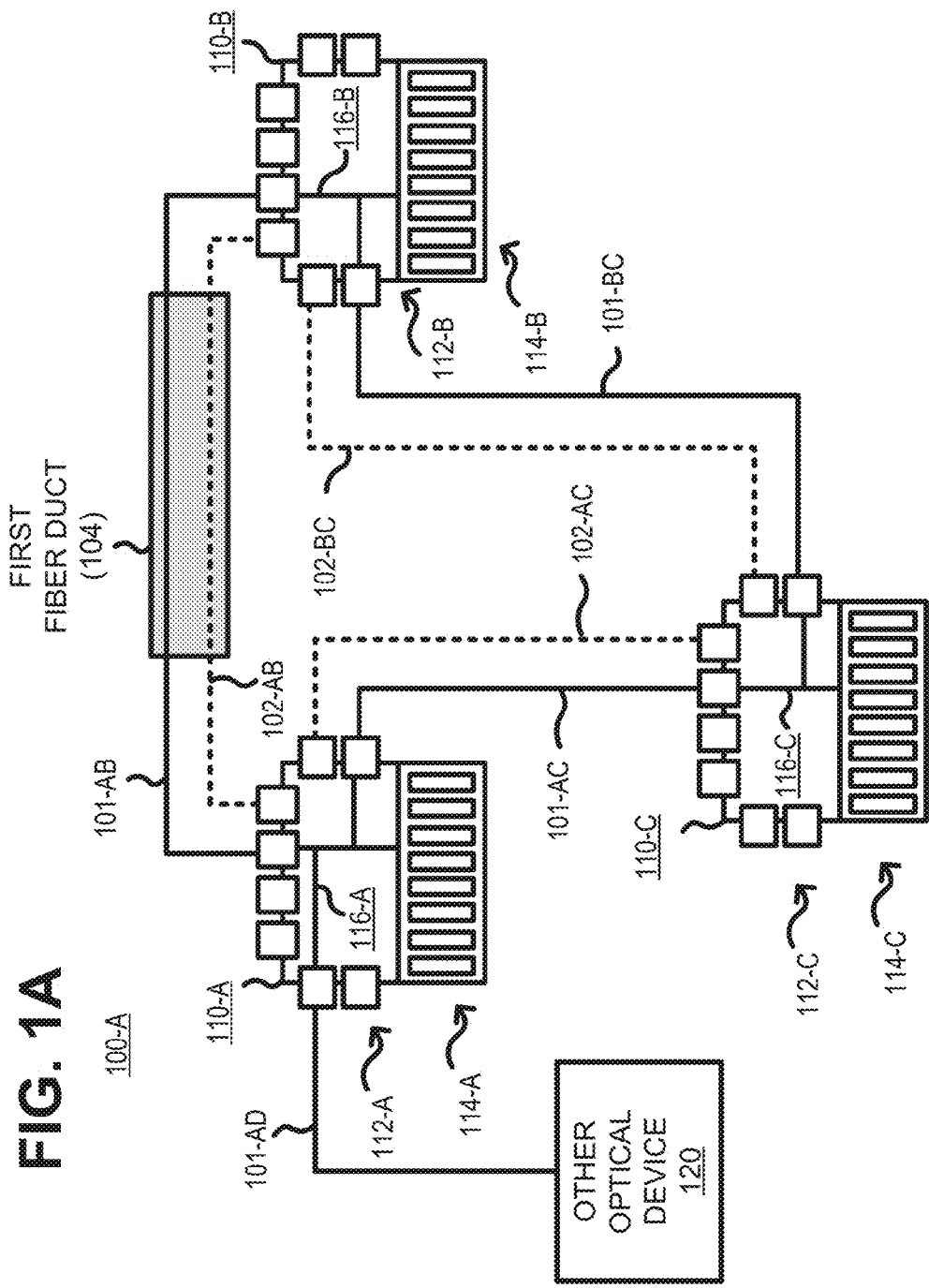

100-B

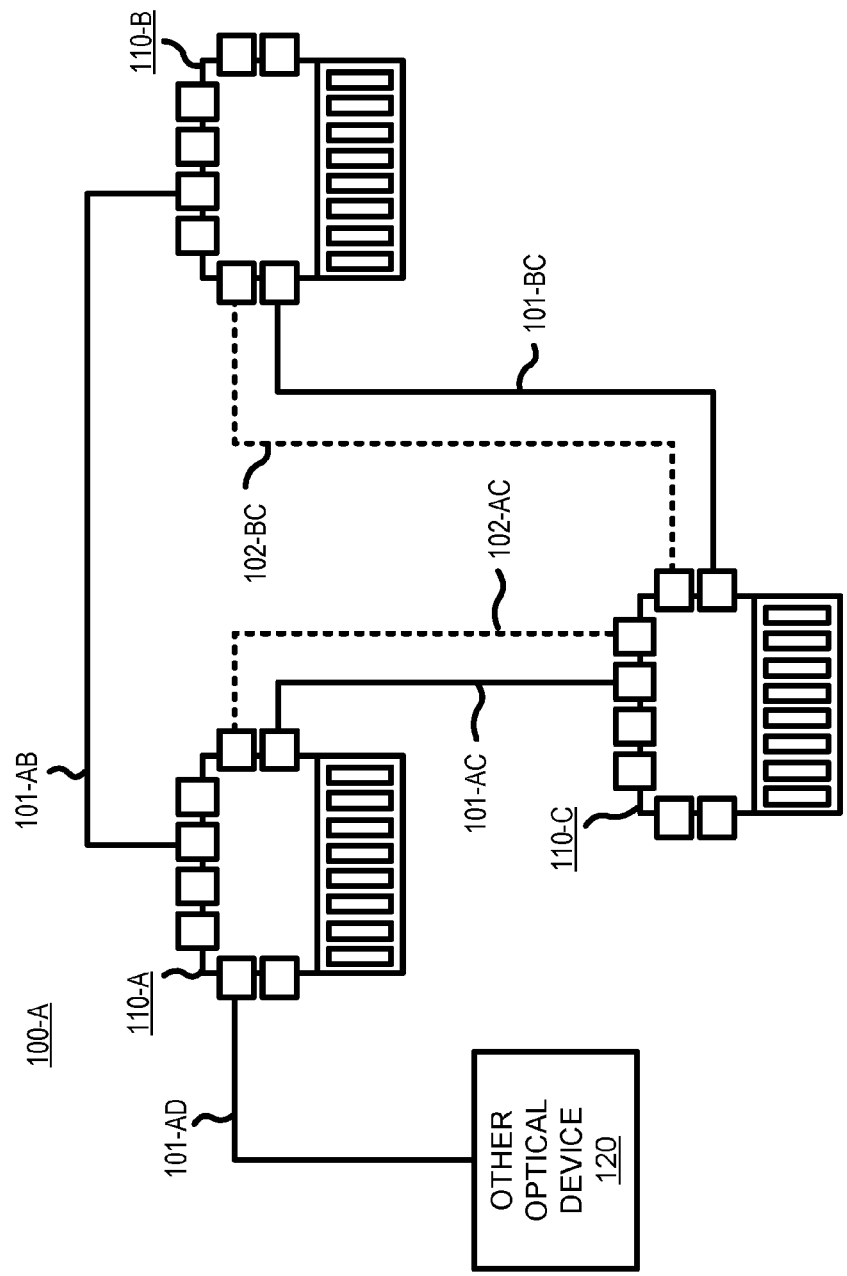

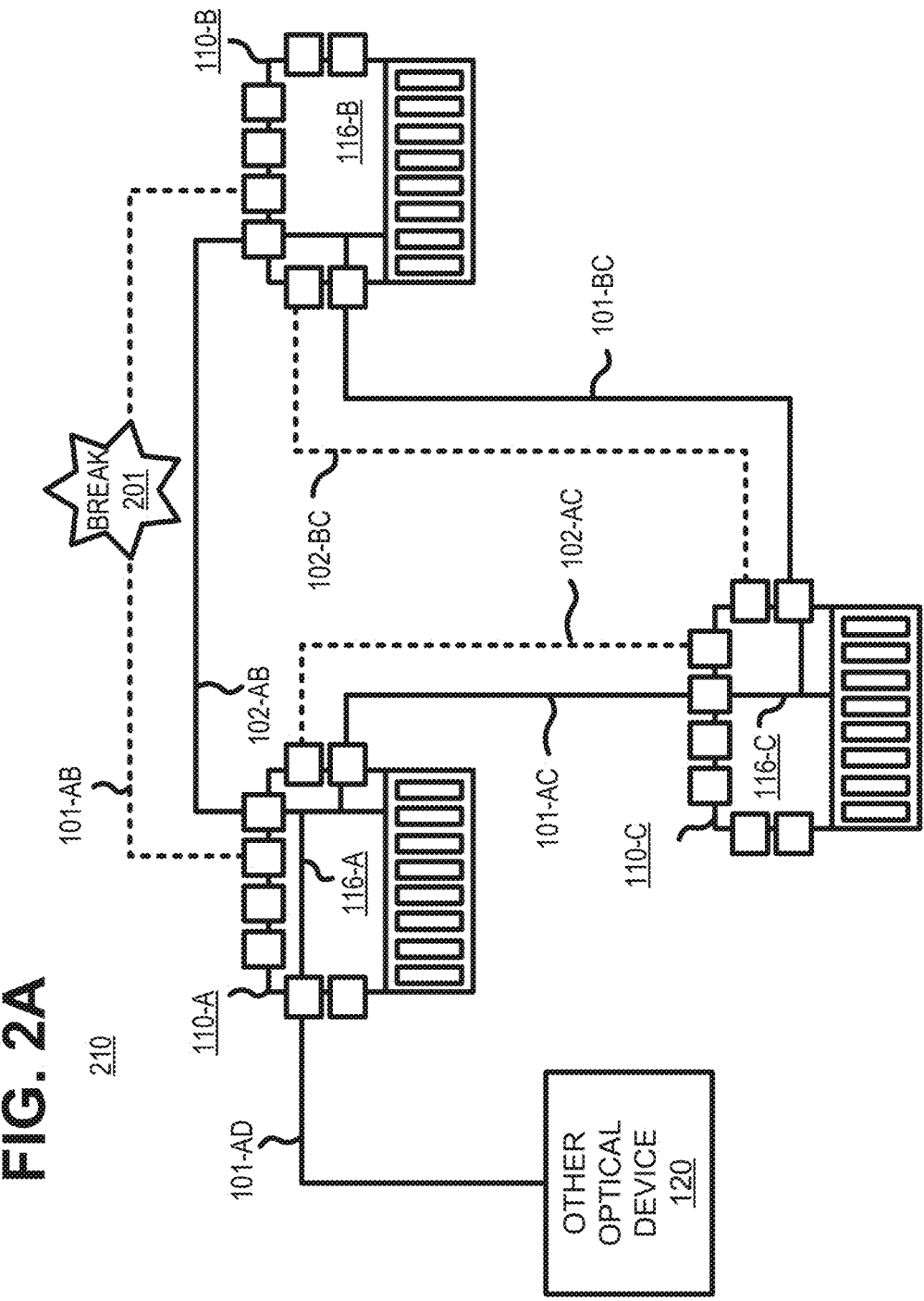

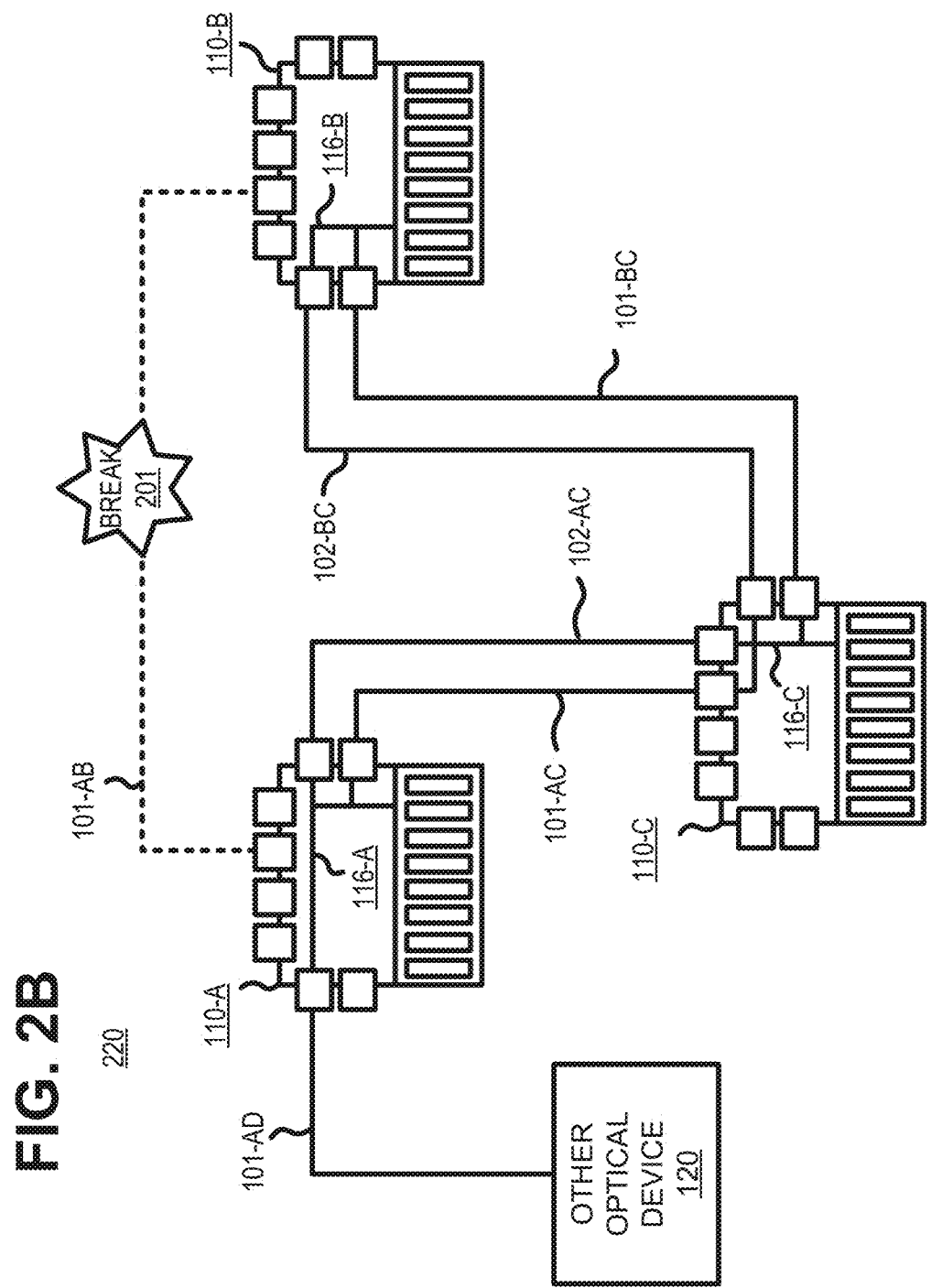

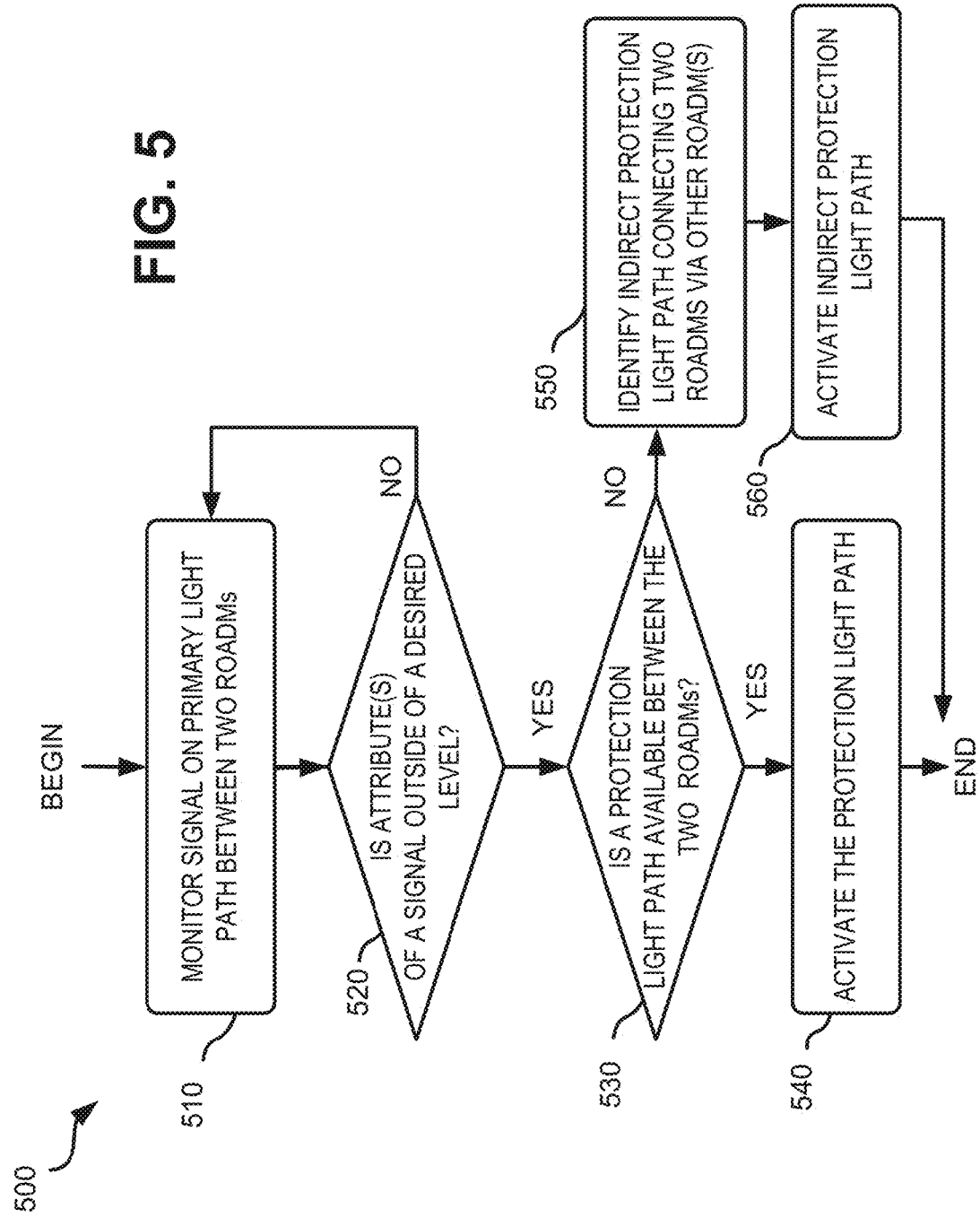

NETWORK PROTECTION THROUGH EXCESS DIRECTIONS OF RECONFIGURABLE OPTICAL ADD/DROP MULTIPLEXOR (ROADM)

BACKGROUND

Various types of optical networks may be used in providing communications and data services. For example, IEEE 802.3ae-2002™ standard, Aug. 30, 2002, and IEEE Draft P802.3Aq™/D4.0, May, 2006, define physical layer specifications for communicating over optical fibers. Section 52-5 of the IEEE 802.3ae-2002 standard specifies requirements for both Short Range (SR) and Long Range (LR) fiber links. Section 68.5 of the IEEE P802.3Aq™/D4.0 draft defines a Long Range Multimode (LRM) fiber link. Colorless, directionless, contentionless (CDC) reconfigurable optical add/drop multiplexers (ROADMs) may be used in wavelength division multiplexing optical transport networks (OTNs) to provide improved performance and efficiency.

BRIEF DESCRIPTION OF THE DRAWINGS

FIGS. 1A through 1D show exemplary environments showing ROADMs that are connected by primary light paths and protection light paths;

FIGS. 2A and 2B are diagrams showing how one or more protection light paths are used to address a failure in a primary light path in the environments of FIGS. 1A-1D;

FIG. 5 is a flow graph showing an exemplary process for providing and using a protection light path in the environment of FIG. 1.

DETAILED DESCRIPTION OF PREFERRED EMBODIMENTS

The following detailed description refers to the accompanying drawings. The same reference numbers in different drawings may identify the same or similar elements.

In implementations described herein, a first reconfigurable optical add/drop multiplexers (ROADM) and a second ROADM are connected by a primary light path and a protection light path. For example, the first and second ROADMs may be colorless, directionless, and contentionless (CDC) ROADMs. The ROADMs may include equipment having directional capability (i.e., hereinafter, "directions"), in which case the first and second ROADMs may include multiple directions (or degrees). For example, the first ROADM includes a first direction and a second direction, and the second ROADM includes a third direction and a fourth direction. The primary light path is coupled to the first direction and the third direction, and the protection light path is coupled to the second direction and the fourth direction. When a problem is detected on the primary light path, the first and third directions may be deactivated and the second and fourth directions may be activated so that light signals are sent on the protection light path and not on the primary light path. The deactivation of the first and third directions and the activation of the second and fourth directions may be initiated by a controller residing on one or more of the ROADMS (e.g., on a control plane) or may be initiated by a separate device.

The protection light path may be an indirect protection light path that passes through a third ROADM, and activating the second and the fourth directions may further include activating directions in the third ROADM associated with the indirect protection light path. The indirect protection light path may be used, for example, when a direct protection light path is not present between the first and second ROADMs or the direct protection light path is unavailable. For example, the direct protection light path may have been damaged with the primary light path.

In one implementation, an attribute monitored on the primary light path may relate, for example, to a desired wavelength associated with the signal, a difference between the wavelength associated with the signal and another wavelength associated with another signal, a desired power level associated with the signal, or a desired wavelength variance associated with the signal.

Figure 1B:
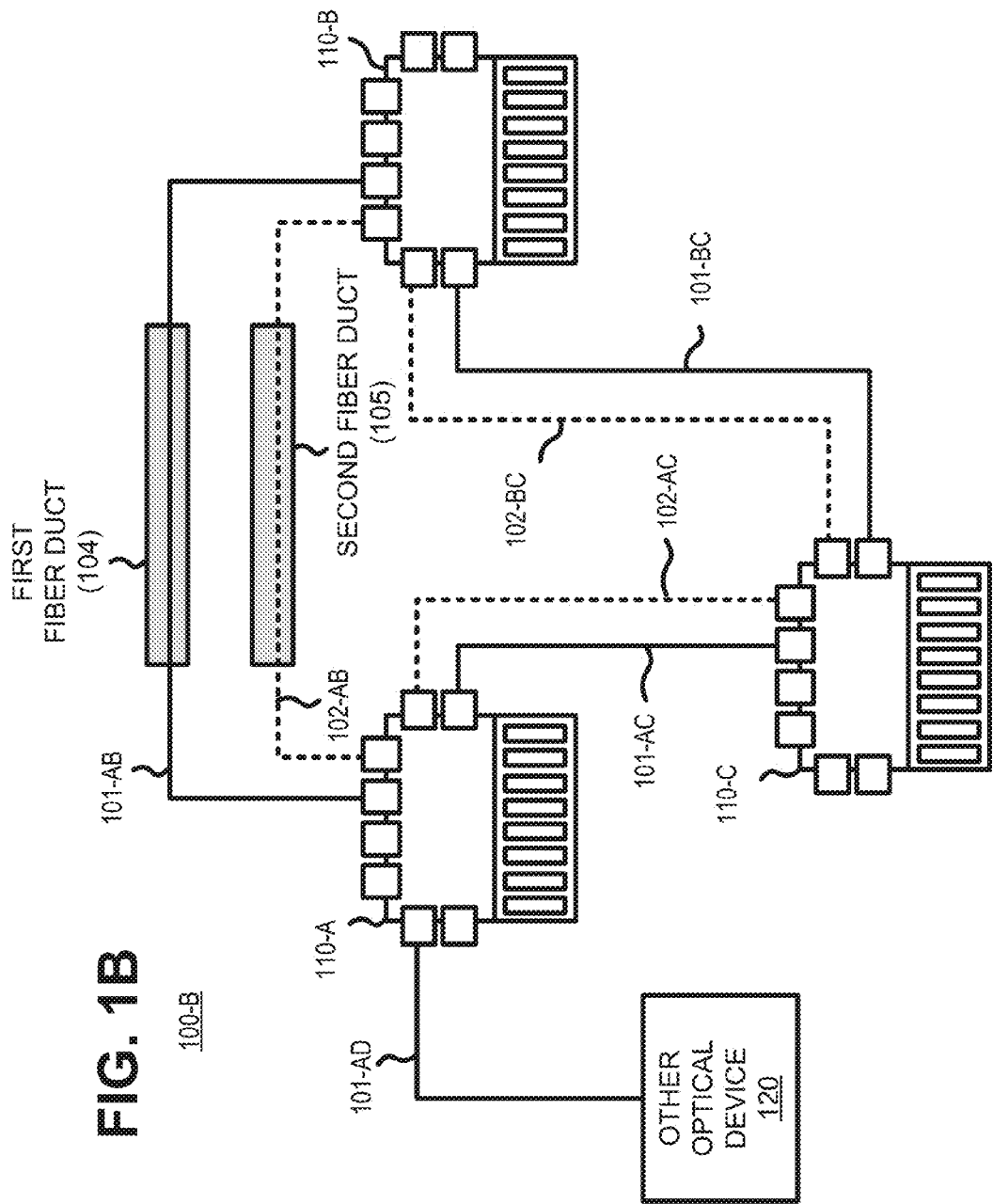

FIGS. 1A and 1B are diagrams showing exemplary systems 100-A and 100-B according to implementations described herein. As shown in FIGS. 1A and 1B, systems 100-A and 100-B may include reconfigurable optical add-drop multiplexers (ROADMs) 110-A through 110-C (referred to herein collectively as "ROADMs 110" and individually as "ROADM 110") connected via primary light paths 101 (shown as solid-line path 101-AB between ROADM 110-A and ROADM 110-B, etc.; and referred to herein collectively as "primary light paths 101" and individually as "primary light path 101") and protection (or backup) light paths 102 (shown as dashed-line path 102-AB between ROADM 110-A and ROADM 110-B, etc.; and referred to herein collectively as "protection light paths 102" and individually as "protection light path 102").

ROADM (also referred to as a ROADM blade) 110 may be an optical add-drop multiplexer that switches, multiplexes, and/or routes traffic in a wavelength-division multiplexing (WDM) system at the wavelength layer, such as in metro or long-haul optical networks. As described below with respect to FIG. 3, ROADM 110 may include two or more directions (or degrees) that enable ROADM 110 to concurrently exchange separate optical signals via different ports. In FIG. 1A, ROADMs 110-A through 110-C are shown as including add/drop sections 112-A through 112-C and transponder sections 114-A through 114-C. Each of add/drop sections 112-A through 112-C may include multiple directions (shown in FIG. 1A as including eight different directions), but ROADM 110 may include any smaller or larger feasible number of directions. Similarly, each of transponder/drop sections 114-A through 114-C may include multiple directions (shown in FIG. 1A as including eight transponder), but ROADM 110 may include any smaller or larger feasible number of transponder.

ROADM 110 may be remotely reconfigurable by another ROADM 110, a controller 130 (shown in FIG. 1D), a user interface, etc. ROADM 110 may include colorless functionality that enables ROADM 110 to assign any wavelength (i.e., color) to any port, directionless functionality that enables ROADM 110 to route any wavelength in any direction served by ROADM 110, contentionless functionality which enables ROADM 110 to receive multiple copies of the same wavelength without causing network contention, and/or gridless functionality that enables ROADM 110 to use adaptive channel widths that do not depend on the channel width of a particular optical network grid, such as a channel width specified by an International Telecommunications Union (ITU) standard.

As shown in FIGS. 1A and 1B, ROADM 110-A and ROADM 110-B may be connected via a primary light path 101-AB and via a protection light path 102-AB. For example, primary light path 101-AB may connect a first direction of ROADM 110-A and a first direction of ROADM 110-B, and a separate protection light path 102-AB may connect a second, different direction of ROADM 110-A and a second, different direction of ROADM 110-B. As further shown in FIG. 1A, ROADMs 110-A and 110-C may be connected via primary light path 101-AC and protection light path 102-AC; and ROADMs 110-B and 110-C may be connected via primary light path 101-BC and protection light path 102-BC. Thus, ROADMs 110A-110-C in system 100-A/100-B may be connected by a mesh of primary light paths 101 and protection light paths 102.

In normal operation, two ROADMs 110 in system 100-A/100-B may be configured so that directions associated with a particular primary light path 101 are activated and optical signals are exchanged between the two ROADMs 110 via the particular primary light path 101. When an error is detected (such as a cut of a fiber included in the particular primary light path 101), directions associated with the particular primary light path 101 may be deactivated and other directions of the two ROADMs 110 may be activated to enable communications via one or more protection light paths 102.

As further shown in FIG. 1A, ROADM 110-A may also be connected via a primary light path 101-AD to another optical device 120. For example, other optical device 120 may include a device that is not compatible with and/or has insufficient capacity to handle protection light path 102 from ROADM 110-A. The other optical device 120 may be a device that differs from ROADM 110, such as an optical network unit (ONU), an optical line terminal (OLT), an optical network terminal (ONT), an amplifier, a switch, a router, etc. In another implementation, other optical device 120 may include a ROADM that does not include CDC capabilities.

Figure 3:
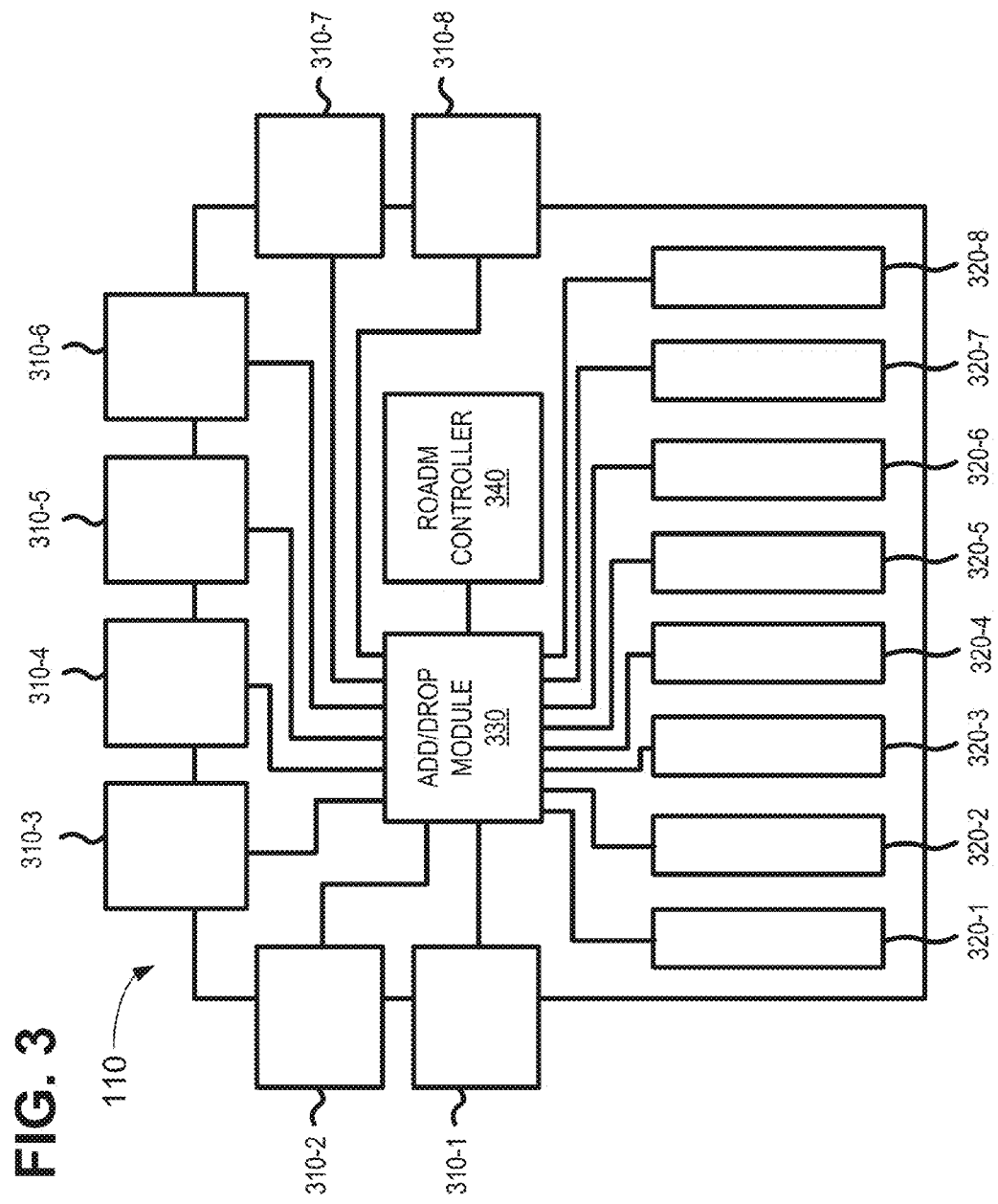
FIG. 3 is a block diagram showing exemplary components of a ROADM included in the environments of FIGS. 1A-1D.

As shown in FIG. 1A, ROADMs 110-A through 110-C may include active internal paths 116-A through 116-C that direct optical signals between the active directions of ROADMs 110-A through 110-C (e.g., the directions associated with primary light paths 101-AB, 101-AC, 101-BC, and 101-AD during normal operation) and other components to generate/process the optical signals, such as transponders included in transponder sections 114 (discussed below in connection with FIG. 3). The depicted active internal paths 116 in FIG. 1A are examples only; more or different paths may exist, as shown in FIG. 3. For example, ROADM 110 may include additional internal paths that may be activated and/or one or more of active internal paths 116 may be selectively deactivated so that different directions are activated, such as to provide optical signals between transponder section 114 and one or more directions associated with a protection light path 102.

In FIGS. 1A and 1B, protection light paths 102-AB, 102-AC, and 102-BC are shown using dashed lines to indicate that the associated directions in ROADMs 110-A, 110-B, and/or 110-C are inactive and that optical signals may not be carried on protection light paths 102-AB, 102-AC, and 102-BC during normal operations. In another implementation, the associated directions in ROADMs 110-A, 110-B, and/or 110-C may be in use but this use may be controlled/limited so that some optical signals (e.g., overflow signals) may simultaneously be carried on protection light paths 102-AB, 102-AC, and 102-BC. However, sufficient protection capacity is reserved to enable protection light paths 102-AB, 102-AC, and 102-BC to also carry traffic in a protection mode between ROADMs 110-A, 110-B, and/or 110-C if and when an error is detected on primary light paths 101-AB, 101-AC, and/or 101-BC.

In system 110-A shown in FIG. 1A, ROADMs 110-A and 110-B may be connected via primary light path 101-AB and protection light path 102-AB that are both included in and/or pass through a first fiber duct 104. For example, first fiber duct 104 may include multiple different optical fibers included in a single fiber bundle, thus accommodating both primary and protection paths. Alternatively, first fiber duct 104 may include only a single optical fiber.

In system 100-B shown in FIG. 1B, ROADMs 110-A and 110-B are connected via primary light path 101-AB that is included in first fiber duct 104 and via protection light path 102-AB that is included in a second, different fiber duct 105. For example, first fiber duct 104 and second fiber duct 105 may include optical fibers that are physically separate, such as optical fibers and/or fiber bundles running along different paths.

While FIGS. 1A and 1B show systems 100-A and 100-B as including a particular number of ROADMs 110, primary light paths 101, protection light paths 102, and other optical device 120 for illustrative purposes, in practice, systems 100-A and 100-B may include a different number of ROADMs 110, primary light paths 101, protection light paths 102, and/or other optical devices 120 than the number shown in FIGS. 1A and 1B. For example, FIG. 1C shows a system 100-C that include ROADMs 110-A through 110C that correspond to similarly labeled components in systems 100-A and 100-B shown in FIGS. 1A and 1B, except that system 100-C does not include protection light path 102-AB between ROADMs 110-A and 110-B. Instead, ROADMs 110-A and 110-B are directly connected only by primary light path 101-AB in system 100-C. For example, system 100-C may correspond to a situation in which protection light path 102-AB is damaged or unavailable (e.g., corresponding direction(s) in ROADMs 110-A and/or 110-B are damaged or allocated to other uses).

Figure 1D:
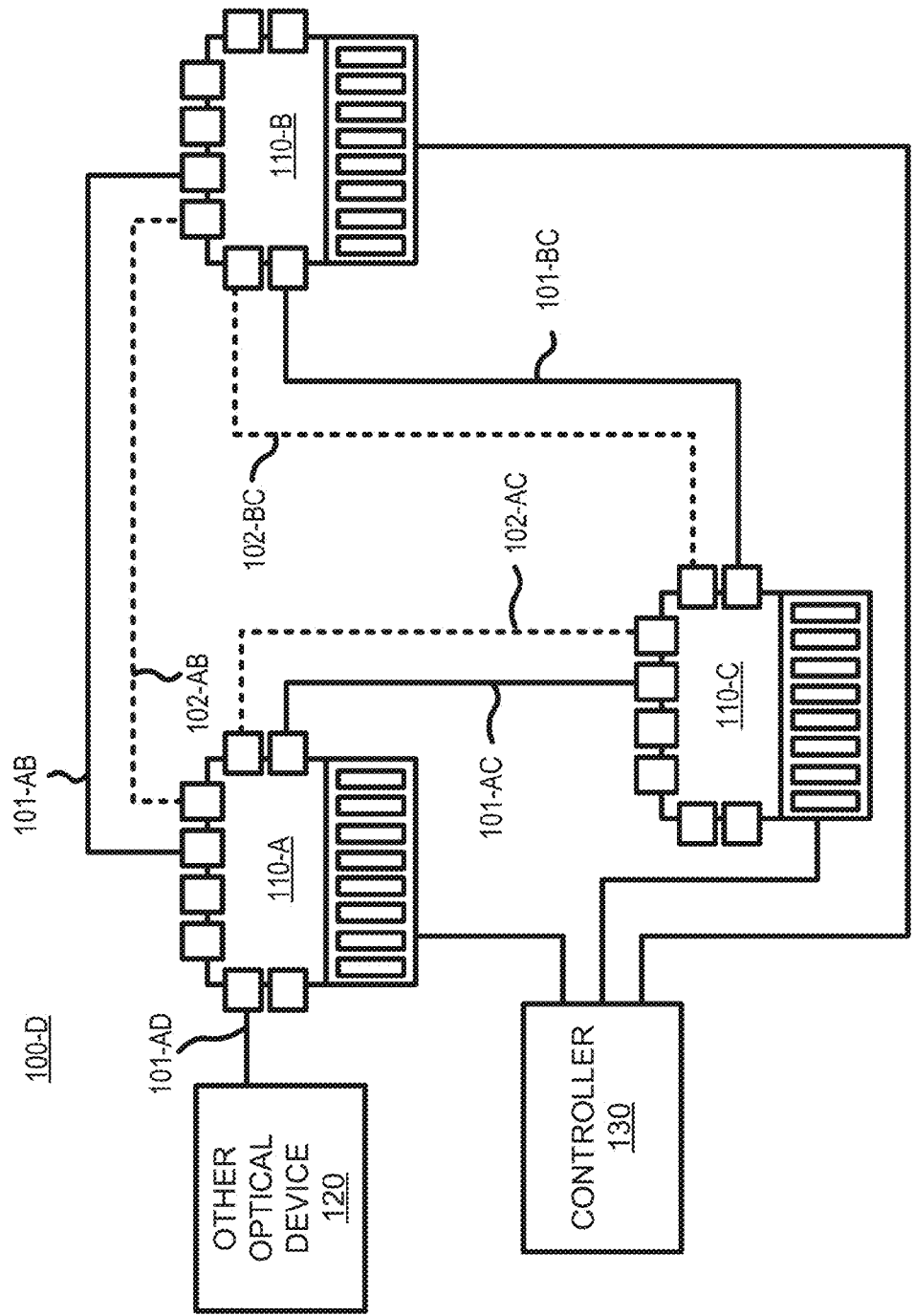

FIG. 1D is a diagram showing an exemplary system 100-D according to another implementation described herein. As shown in FIG. 1D, system 100-D may include ROADMs 110 connected by primary light paths 101 and protection lights paths 102 (as described above with respect to FIGS. 1A-1C) and may further include a controller 130. While FIG. 1D shows system 100-D as including a particular number of ROADMs 110 and controller 130 for illustrative purposes, in practice, systems 100-D may include a different number of ROADMs 110 and/or and controllers 130 than shown in FIG. 1D.

In system 100-D shown in FIG. 1D, one or more of ROADMs 110-A through 110-C may be connected to controller 130. Controller 130 (also referred do as a control plane or board) may coordinate different ROADMs 110. For example, controller 130 may configure one or more of directions of a ROADM 110 to selectively activate (e.g., to receive/output optical signals). For example, in normal operation, controller 130 may cause ROADMs 110-A and 110-B to selectively activate particular directions to enable exchange of optical signals via primary light path 101-AB or protection light path 102-AB.

In accordance with the implementation shown in FIG. 1D, controller 130 may automatically provision active internal paths 116 (shown in FIG. 1A) in a pair of ROADMs 110 to selectively activate or deactivate a primary light path 101 and/or a protection light path 102 connecting the pair of ROADMs 110.

Controller 130 may be a component that is separate from ROADMs 110. For example, controller 130 may be a computing device that communicates with ROADM 110 to provide control signals and to receive data regarding a status of ROADM 110. Additionally or alternatively, controller 130 may be included as a component in one or more ROADMs 110. For example, controller 130 may be implemented as an operational support system (OSS) or a distributed or centralized control plane running on one or more ROADMs 110 within environment 100, or a combination of the two depending on the specific OSS and/or control plane capabilities and implementation.

In one implementation, controller 130 may include a sensor to monitor a primary light path 101 and/or may receive data associated with the monitoring of the primary light path 101 that is performed by another device. For example, controller 130 may receive monitoring data from ROADMs 110-A and 110-B or an intermediate monitoring device (not shown in FIG. 1D). If system 100-D includes the intermediate monitoring device, the intermediate monitoring device may be a sub-optical monitoring unit positioned to extract a portion of an output of an additional unit of ROADM 110, such as a power coupler. The intermediate monitoring device may include, for example, a waveguide and/or other optical component to acquire an optical signal generated by ROADM 110 and a photodetector and/or other components to measure a property associated with the optical signal.

Controller 130 may analyze the monitoring data to identify physical attributes of a transmission on primary light path 101. For example, controller 130 may identify a peak wavelength (e.g., a color), a power level, a wavelength variance (or spread), etc. of a transmission on primary light path 101 and may use these physical characteristics to identify whether an undesirable color shift, a signal loss, a power loss, a signal attenuation, etc. is occurring on primary light path 101. Additionally or alternatively, controller 130 may interface with one or more ROADMs 110 to identify data transmission performance, such as quantities of dropped packets, bandwidth levels, transmission delays/congestion levels, interference, etc. on a primary light path 101.

Controller 130 may evaluate the physical and/or data properties of an optical signal to determine a status of a corresponding primary light path 101. For example, controller 130 may compare the measured actual properties of an optical signal from primary light path 101 with desired properties of the optical signals. Controller 130 may further provide control signals to one or more ROADMs 110 based on the comparison. For example, if the determined physical and/or data characteristics are outside of desired levels or thresholds values, controller 130 may modify active internal paths 116 in ROADMs 110 to activate certain directions associated with a protection light path 102.

The configurations illustrated in FIGS. 1A-1D are provided for simplicity. It should be understood that any of systems 100-A through 100-D may include more or fewer components. For example, one of systems 100-A through 100-D may include optical components such as waveguides, filters, amplifiers, etc. Furthermore, it should be appreciated that functions described as being implemented by a single component in any of systems 100-A through 100-D may be performed by multiple components, and functions described as being implemented by multiple component in any of systems 100-A through 100-D may be performed by a single component.

FIG. 2A is a diagram showing an exemplary first portion 210 of system 100-A. As shown in FIG. 2A, first portion 210 may include ROADMs 110-A through 110-C connected via primary light paths 101-AB, 101-AC, and 101-BC and protection light paths 102-AB, 102-AC, and 102-BC and other optical device 120, as previously described with respect to FIG. 1A.

As shown in FIG. 2A, first portion 210 may relate to addressing a break 201 in primary light path 101-AB (now shown as a dashed line to indicate it is inactive due to the break). Break 201 may correspond, for example, to a cut in first fiber duct 104 and/or a failure in components associated with the associated directions in ROADMs 110-A and/or 110-B coupled to primary light path 101-AB. For example, as described above, controller 130 (FIG. 1D) may monitor transmissions on primary light path 101-AB and may identify break 201 based on determining that one or more physical and/or data attributes associated with a transmission on primary light path 101-AB do not meet desired characteristics.

In first portion 210, break 201 may be addressed by deactivating primary light path 101-AB and activating protection light path 102-AB (now shown as a solid line to indicate it is active). For example, active internal paths 116-A and 116-B in ROADMs 110-A and 110-B may be adjusted so that optical signals are carried between ROADMs 110-A and 110-B via protection light path 102-AB and not by primary light path 101-AB. In this way, first portion 210 may be dynamically adjusted so that ROADMs 110-A and 110-B remain connected without disruption, despite the occurrence of break 201.

FIG. 2B is a diagram showing an exemplary second portion 220 of system 100-C according to one implementation. As shown in FIG. 2B, second portion 220 may include ROADMs 110-A through 110-C connected via primary light paths 101-AB, 101-AC, and 101-BC and protection light paths 102-AC and 102-BC and other optical device 120, as previously described with respect to system 100-C in FIG. 1C.

As shown in FIG. 2B, break 201 in primary light path 101-AB between ROADMs 110-A and 110-B may be addressed in second portion 220 even when a protection light path 102-AB is not present or is not available between ROADMs 110-A and 110-B (e.g., optical fiber duct 104/105 carrying protection light path 102-AB is cut).

In second portion 220, break 201 in primary light path 101-AB may be addressed by deactivating primary light path 101-AB and routing traffic between ROADMs 110-A and 110-B via protection light paths 102-AC and 102-BC associated with intermediary ROADM 110-C. For example, protection light paths 102-AC and 102-BC may be activated to provide a communications channel between ROADMs 110-A and 110-B. For example, active internal paths 116-A, 116-B, and 116-C in ROADMs 110-A through 110-C may be adjusted so that optical signals are internally routed within ROADMs 110-A through 110-C away from directions associated with faulty primary light path 101-AB and to directions associated with protection light paths 102-AC and 102-BC. For example, active internal paths 116-C in ROADM 110-C may be adjusted so that ROADM 110-A and ROADM 110-B may exchange communications via protection light paths 102-AC and 102-BC while bypassing transponders in ROADM 110-C. In this way, second portion 220 may be dynamically adjusted so that communications are automatically maintained between ROADMs 110-A and 110-B despite break 201 in primary light path 101-AB (so that active internal paths 116 in FIG. 2B are different from the active internal paths 116 shown in FIG. 1A.)

FIG. 3 is a diagram illustrating exemplary components of a ROADM 110 that may be included in one or more of systems 100-A through 100-D. As shown in FIG. 3, ROADM 110 may include multiple directions 310-1 through 310-8 (referred to herein collectively as "directions 310" and individually as "direction 310"), transponders 320-1 through 320-8 (referred to herein collectively as "transponders 320" and individually as "transponder 320"), an add/drop module 330, and a ROADM controller 340. While FIG. 3 illustrates ROADM 110 as including eight directions 310, eight transponders 320, a single add/drop module 330, and a single ROADM controller 340 for illustrative purposes, in practice, ROADM 110 may include a different number of directions 310, transponders 320, add/drop modules 330, and/or ROADM controllers 340.

Direction 310 may include various components such as a port, waveguide, etc. to exchange optical signals with primary light paths 101 and/or protection light paths 102. Direction 310 may further include other components such as various filters, amplifiers, monitors, lenses, attenuators, mirrors, etc. to selectively direct optical signals to other directions 310, transponders 320, or add/drop module 330.

Transponders 320 may include components, such as optical receivers to convert optical signals received via directions 310 to electrical signals for processing (e.g., to extract data from the optical signals) and/or optical transmitters to convert electrical signals into optical signals.

Add/drop module 330 may include components to add an optical signal to a multiplexed optical output of a direction 310 and/or to extract an optical signal from a multiplexed input from a direction 310. Add/drop module 330 may include, for example, a wavelength selective switch (WSS, not shown) that selects a particular wavelength, or range of wavelengths, from a first optical fiber for transmission onto a second optical fiber. For example, a WSS associated with add/drop module 330 may be coupled to a first optical fiber, may select an optical signal in a particular range of wavelengths from the first optical fiber, and may divert the selected optical signal onto a second optical fiber that may connect to a remote ROADM 110 (or another type of device). In one implementation, WSS may be implemented as an array of micro-electromechanical system (MEMS) mirrors, a liquid crystal on Silicon (LCoS) system a liquid crystal (LC) system, or other type of system.

Add/drop module 330 may also include, for example, a power splitter (PS) that splits an optical signal from a first optical fiber into multiple optical signals. For example, a PS may forward a received optical signal to one or more directions 310 (e.g., via the WSS) and/or provide the received optical signal to a transponder 320 for conversion and processing.

In operation, add/drop module 330 may receive an optical signal in a particular range of wavelengths from another device (such as another ROADM 110 or other optical device 120) and may add the optical signal to a WSS or may receive an optical signal in a particular range of wavelengths from a PS and may provide the optical signal to the other device.

ROADM controller 340 may control direction 310, transponder 320, and/or add/drop module 330. For example, ROADM controller 340 may configure a WSS included in add/drop module 330 to add an optical signal in a particular range of wavelengths to a mulitplexed signal outputted by a direction 310 and/or may configure a PS in add/drop module 330 to extract an optical signal in a particular range of wavelengths included in a multiplexed signal outputted by a direction 310. ROADM controller 340 may control add/drop module 330 to selectively modify active internal paths 116 within ROADM 110 by modifying optical signals sent/received by various directions 310.

Although FIG. 3 shows exemplary components of ROADM 110, in other implementations, ROADM 110 may include fewer components, different components, additional components, or differently arranged components than those depicted in FIG. 3. For example, as previously described, ROADM 110 may include an optical monitoring component to identifying one or more attributes of a signal received/sent from a direction 310. Additionally or alternatively, one or more components of ROADM 110 may perform one or more tasks described as being performed by one or more other components of ROADM 110.

Figure 4:
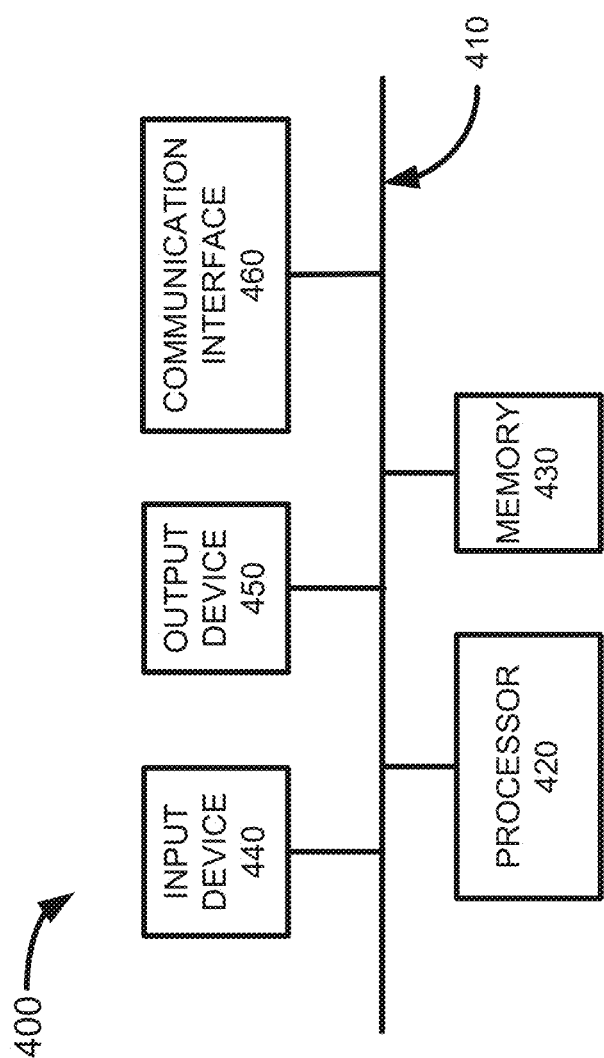
FIG. 4 is a block diagram showing exemplary components of a device that may be included in the environments of FIGS. 1A-1D.

FIG. 4 is a diagram illustrating exemplary components of a device 400 that may be included in the environments of FIGS. 1 and 2, according to an implementation described herein. For example, controller 130 and/or ROADM controller 340 of ROADM 110 may each include one or more devices 400. One or more of components included in device 400 may be implemented and/or installed as software, hardware, or a combination of hardware and software. As shown in FIG. 4, device 400 may include, for example, a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as, or include, one or more application specific integrated circuits (ASICs), field programmable gate arrays (FPGAs), and/or the like.

Memory 430 may include a random access memory (RAM) or another type of dynamic storage device that stores information and instructions for execution by processing unit 420, a read only memory (ROM), electrical erasable permanent memory (Flash) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include a transceiver that enables device 400 to communicate with other devices and/or systems. For example, communication interface 460 may include mechanisms for communicating with other devices, such as other devices of environment 100.

As described herein, device 400 may perform certain operations in response to processing unit 420 executing software instructions contained in a computer-readable medium, such as memory 430. A computer-readable medium may include a tangible, non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may include fewer components, different components, differently arranged components, or additional components than those depicted in FIG. 4. Furthermore, it should be appreciated that tasks described as being performed by two or more other components of device 400 may be performed by a single component, and tasks described as being performed by a single component of device 400 may be performed by two or more components.

FIG. 5 is a flow graph of an exemplary process 500 for handling a fault, such as break 201, in a primary light path 101 between two ROADMs 110. In one implementation, process 500 may be performed by controller 130 and/or ROADM controller 340. In another implementation, some or all of process 500 may be performed by controller 130 and/or ROADM controller 340 in conjunction with one or more other devices (not shown in FIGS. 1A-1D). Process 500 is described with reference to components described above with respect to FIGS. 1A-1D, 2A-2B and 3.

As shown in FIG. 5, process 500 may include monitoring a signal on a primary light path 101 between two ROADMs 110 (block 510), and determining whether an attribute of the signal is outside of a desired level or range (block 520). For example, controller 130 may include or may be coupled to an optical monitor (not shown in FIGS. 1A-1D) that receives multiplexed signals carried on primary light path 101 and may demultiplex a signal. Additionally or alternatively, ROADM controller 340 may include or may be coupled to an optical monitor (not shown in FIG. 3) that receives a signal, from transponder 320 and/or add/drop module 330. The optical monitor may identify an attribute associated with the detected signal, such as peak frequency, power level, etc. and determine whether the attribute is outside of a desired level. For example, controller 130 and/or ROADM controller 340 may determine whether the measured peak frequency or power level differs by more than a threshold amount from desired levels.

Controller 130 may dynamically determine the desired signal level and/or range. Controller 130 and/or ROADM controller 340 may determine the desired signal level or range based on tuning instructions provided to a corresponding ROADM 110. For example, controller 130 and/or ROADM controller 340 may previously instruct a direction of ROADM 110 to output a signal on primary light path 101 at a particular wavelength and/or power level. In another example, controller 130 and/or ROADM controller 340 may receive a user input and determine the desired signal level and/or range based on the user input. For example, controller 130 and/or ROADM controller 340 may include a graphical user interface (GUI) or other interface to receive the input from the user.

Alternatively or in addition, a signal may be evaluated in process block 520 with respect to another signal on primary light path or on another primary light path 101. For example, controller 130 and/or ROADM controller 340 may measure and compare attributes from two signals associated with different primary light paths 101. For example, controller 130 and/or ROADM controller 340 may determine whether power levels or other attribute of the two signals differ by more than a threshold amount.

In another example, process block 520 may include determining the primary light path 101 is faulty (e.g., associated with a break 201) when more than a threshold amount of time has passed since a signal is received on a primary light path 101. Additionally or alternatively, primary light path 101 may be determined to be faulty if a less than a threshold number of signals are received on the primary light path 101 during a time period.

Continuing with process 500 in FIG. 5, if the signal attribute(s) is not outside of desired levels or ranges (block 520-No), controller 130 and/or ROADM controller 340 may continue to monitor the signals on primary light path 101 in process block 510 without modifying the configuration of the two ROADMs 110.

As shown in FIG. 5, process 500 may also include, when the signal attribute(s) is outside of desired levels or ranges (block 520-Yes), determining whether a protection light path 102 is present/available between the two ROADMs 110 associated with the primary light path 101 (block 530). For example, controller 130 and/or ROADM controller 340 may determine whether the two ROADMs 110 are connected by a protection light path 102. If a protection light path 102 is present between the two ROADM 110, controller 130 and/or ROADM controller 340 may determine whether the protection light path 102 is available. For example, controller 130 and/or ROADM controller 340 may determine whether directions in the two ROADMs 110, which are associated with protection light path 102, have been previously activated (e.g., are allocated to another purpose, such as providing an indirect protection light path for another ROADM 110). Additionally or alternatively, controller 130 and/or ROADM controller 340 may cause the two ROADMs 110 to transmit sample data (e.g., a test packet) via the protection light path 102, and controller 130 and/or ROADM controller 340 may determine whether the transmission of the sample data on the protection light path 102 achieved one or more desired criteria. For example, controller 130 and/or ROADM controller 340 may monitor transmission of the sample data via protection light path 102 and may determine whether the transmission better meets the desired levels/ranges.

If a protection light path 102 is available between the two ROADMs 110 (block 530-Yes), controller 130 and/or ROADM controller 340 may activate the protection light path 102 (block 540) and process 500 ends. For example, controller 130 and/or ROADM controller 340 may forward instructions to the two ROADMs 110 to activate particular directions associated with (e.g., coupled to) protection light path 102. For example, add/drop modules 330 may be configured to establish active internal paths 116 providing desired frequencies or wavelengths to the directions associated with protection light path 102.

If a direct protection light path 102 is not available between the two ROADMs 110 (block 530-No), controller 130 and/or ROADM controller 340 may identify indirect protection light paths 102 that connect the two ROADMs 110 via one or more other ROADMs 110 (block 550). For example, as described in the discussion of FIG. 2B, ROADMs 110-A and 110-B may be connected via protection light paths 102-AC and 102-BC that pass through ROADM 110-C when a direct protection light path 102-AB is not present/available. Controller 130 and/or ROADM controller 340 may activate the indirect protection light path 102 (block 560) and process 500 ends. For example, controller 130 and/or ROADM controller 340 may forward instructions to ROADMs 110-A through 110-C associated with the indirect protection light paths 102-AC and 102-BC. For example, as described in the discussion of FIG. 2B, appropriate directions included in ROADMs 110-A through 110-C may be initiated to activate protection light paths 102-AC and 102-BC and to activate appropriate active internal paths 116-C in ROADM 110-C, to connect ROADMs 110-A and 110-B. For example, internal paths 116-C in ROADM 110-C may connect protection light paths 102-AC and 102-BC but bypass transponders included in ROADM 110-C with respect to signals being carried between ROADMs 110-A and 110-B.

The controller 130 and/or ROADM controller 340 may also notify a network management system (not displayed) that a particular primary light path 101 is associated with a malfunction or other problem. For example, in system 100-A shown in FIG. 1A, the network management system may instruct or otherwise cause other optical device 120 and/or another ROADM 110 to stop routing signals via ROADM 101-AD. Controller 130 and/or ROADM controller 340 may also control ROADMs 110-A and 110-B to also disregard signals previously exchanged via primary light path 101-AB.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Further, non-dependent blocks may be performed in parallel. For example, while a series of blocks has been described with respect to process 500 in FIG. 5, the order of the blocks may be modified in other implementations. For example, controller 130 may further initiate maintenance on primary light path 101 and may cause optical signals between two ROADMs to be carried on primary light path 101 when the maintenance is completed.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component," a "module," "logic," or a "system" that performs one or more functions. These may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
monitoring, by a processor, a first signal carried on a primary light path between a first reconfigurable optical add/drop multiplexer (ROADM) and a second ROADM, wherein the first ROADM includes a first port and a second port, the second ROADM includes a third port and a fourth port, wherein the primary light path is coupled between the first port and the third port;
determining, by the processor, that a characteristic of the first signal does not satisfy a threshold value or a threshold range of values;
deactivating, by the processor and in response to determining that the characteristic of the first signal does not satisfy the threshold value or the threshold range of values, the first port and the third port;
transmitting, by the processor, a test signal via a protection light path, wherein the protection light path is coupled between the second port and the fourth port;
determining, by the processor, whether a transmission criterion is achieved when transmitting the test signal via the protection light path; and
activating, by the processor and based on determining that the transmission criterion is achieved, the second port and the fourth port, wherein a second signal is sent on the protection light path based on activating the second port and the fourth port.

2. The method of claim 1, wherein each of the first ROADM and the second ROADM includes a colorless, directionless, and contentionless (CDC) ROADM.

3. The method of claim 1, wherein the processor is included in one of the first ROADM or the second ROADM.

4. The method of claim 1, wherein the primary light path includes a first fiber duct, and the protection light path includes a second fiber duct that differs from the first fiber duct.

5. The method of claim 1, further comprising:
activating, based on determining that the transmission criterion is not achieved, the second port, the fourth port, a fifth port included in a third ROADM, and a sixth port included in the third ROADM, wherein activating the second, fourth, fifth, and sixth ports causes the second signal to be sent between the first ROADM and the second ROADM through the third ROADM.

6. The method of claim 1, wherein determining that the characteristic does not satisfy the threshold value or the threshold range of values includes determining whether a break is present in the primary light path, and
wherein the first port and the third port are deactivated based on determining that the break is present in the primary light path.

7. The method of claim 1, wherein the first ROADM includes first active internal paths and the second ROADM includes second active internal paths, and
wherein deactivating the first port and the third port and activating the second port and the fourth port include:
modifying the first active internal paths and the second active internal paths to direct the second signal to the second port and the fourth port and away from the first port and the third port.

8. A device comprising:
a memory configured to store instructions; and
a processor configured to execute one or more of the instructions to:
monitor a first signal carried on a primary light path between a first reconfigurable optical add/drop multiplexer (ROADM) and a second ROADM, wherein the first ROADM includes a first port and a second port, the second ROADM includes a third port and a fourth port, the first port and the third port are activated, and the second port and the fourth port are deactivated;
determine whether a characteristic of the first signal satisfies a threshold value or a threshold range of values;

deactivate, when the characteristic does not satisfy the threshold value or the threshold range of values, the first port and the third port;
identify an available path between the second port of the first ROADM and the fourth port of the second ROADM; and
activate, based on identifying the available path, the second port, the fourth port, a fifth port included in a third ROADM, and a sixth port included in the third ROADM, wherein a second signal is sent on the identified available path between the first ROADM and the second ROADM through the third ROADM based on activating the second port, the fourth port, the fifth port, and the sixth port.

9. The device of claim 8, wherein each of the first ROADM and the second ROADM includes a colorless, directionless, and contentionless (CDC) ROADM.

10. The device of claim 8, wherein the device is included in at least one of the first ROADM or the second ROADM.

11. The device of claim 8, wherein the primary light path includes a fiber duct.

12. The device of claim 8, wherein the primary light path includes a fiber duct.

13. The device of claim 8, wherein the characteristic includes a power level, a peak frequency, or a frequency range.

14. The device of claim 8, wherein the first ROADM includes first active internal paths and the second ROADM includes second active internal paths, and
wherein the processor, when executing the one or more of the instructions to deactivate the first port and the third port and to activate the second port and the fourth port, is further configured to:
modify the first active internal paths and the second active internal paths to direct the second signal to the second port and fourth port and not to the first port and third port.

15. A non-transitory computer-readable medium configured to store instructions, the instructions including:
one or more instruction that, when executed by a processor, cause the processor to:
monitor a first signal carried on a primary light path between a first reconfigurable optical add/drop multiplexer (ROADM) and a second ROADM, wherein the first ROADM includes first transponders, a first port, and a second port, wherein the second ROADM includes second transponders, a third port, and a fourth port, wherein the primary light path is coupled between the first port and the third port, wherein the first port and the third port are activated, and wherein the second port and the fourth port are deactivated;
determine whether a characteristic of the first signal satisfies a threshold value or a threshold range of values;
deactivate, when the characteristic does not satisfy the threshold value or the threshold range of values, the primary light path, wherein the one or more instructions further cause the processor, when deactivating the primary light path, to deactivate a first internal path from the first port to a first transponder of the first transponders and a second internal path from the third port to a second transponder of the second transponders; and
activate, based on the deactivating the primary light path, a protection light path, wherein the protection light path is coupled between the second port and the fourth port and passes through a third ROADM, wherein the one or more instructions further cause the processor, when activating the protection light path, to:
activate a third internal path from the second port to a third transponder of the first transponders and a fourth internal path from the fourth port to a fourth transponder of the second transponders, and
pass a second signal from the first ROADM to the second ROADM through the third ROADM based on activating the third internal path and the fourth internal path,
wherein the second signal is sent on the protection light path based on activating the protection light path.

16. The non-transitory computer-readable medium of claim 15, wherein the processor is included in one of the first ROADM or the second ROADM.

17. The non-transitory computer-readable medium of claim 15, wherein the primary light path includes a first fiber duct, and the protection light path includes a second fiber duct that differs from the first fiber duct.

18. The non-transitory computer-readable medium of claim 15, wherein the one or more instructions, when causing the processor to activate the protection light path, further cause the processor to:
activate the second port, the fourth port, a fifth port included in the third ROADM, and a sixth port included in the third ROADM, wherein activating the second, fourth, fifth, and sixth ports causes the second signal to be sent between the first ROADM and the second ROADM through the third ROADM.

19. The non-transitory computer-readable medium of claim 15, wherein the characteristic includes at least one of a number of drop packets, a bandwidth, or a congestion level.

20. The non-transitory computer-readable medium of claim 15, wherein the one or more instructions, when causing the processor to deactivate the primary light path and to activate the protection light path, further cause the processor to:
modify the first internal path, the second internal path, the third internal path, and the fourth internal path to direct the second signal to the second port and the fourth port and not to the first port and the third port.

* * * * *